Figure 1:
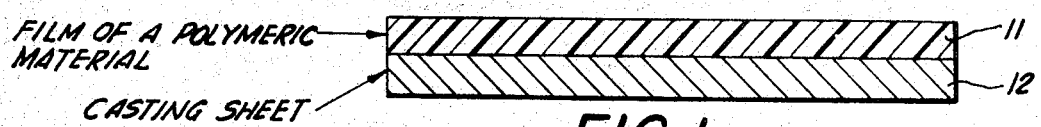

United States Patent

[11] 3,623,944

[72] Inventor Irwin J. Davis
 Plainfield, N.J.
[21] Appl. No. 379,504
[22] Filed July 1, 1964
[45] Patented Nov. 30, 1971
[73] Assignee Compac Corporation (c/o Laird Industries Inc.)
 New York, N.Y.

[54] PRESSURE SENSITIVE ADHESIVE COATED POLYMERIC FILM LAMINATES
6 Claims, 6 Drawing Figs.

[52] U.S. Cl. .................................................. 161/242,
 161/167, 161/254, 117/1.5, 117/122, 117/161,
 156/230, 156/246
[51] Int. Cl. ...................................................... B41m 3/14,
 B26b 27/08
[50] Field of Search .......................................... 117/1, 1.5,
 122 PR, 122 PF, 138 U, 161 UHC; 161/406, 254,
 406 T, 242; 156/242, 230, 243, 246, 247, 239,
 238; 264/216, 171

[56] References Cited
UNITED STATES PATENTS

| | | | |
|---|---|---|---|
| 3,285,771 | 11/1966 | Dabroski | 117/1 |
| 3,197,352 | 7/1965 | Coates | 156/242 |
| 3,014,828 | 12/1961 | Reese | 156/231 |
| 2,459,279 | 1/1949 | Holden | 156/246 |
| 2,191,704 | 2/1940 | Bennett | 161/406 T |
| 2,845,728 | 8/1958 | Huber | 117/122 P |
| 2,937,956 | 5/1960 | Fendius et al. | 117/122 PF |
| 2,973,286 | 2/1961 | Ulrich | 117/122 PA |
| 3,073,734 | 1/1963 | Bemmels | 117/122 PF |
| 3,087,850 | 4/1963 | Cole | 156/230 |
| 3,189,480 | 6/1965 | Franzen et al. | 117/122 PA |

Primary Examiner—Robert F. Burnett
Assistant Examiner—R. J. Roche
Attorney—James and Franklin ABSTRACT: A pressure sensitive adhesive comprising a two-ply laminate, wherein the upper lamina comprises a friable polymeric film and the lower lamina, which is bonded to and in intimate face-to-face contact with said upper lamina, comprises a film of a tacky, pressure sensitive adhesive; the said polymeric film having a tensile strength, at its breaking point, which is less than the strength of the adhesive bond formed between the said pressure sensitive adhesive film and any solid substrate to which said pressure sensitive adhesive film may be adhered, thereby resulting in the mechanical rupture of said upper lamina polymeric film when an attempt is made to remove the laminate from said solid substrate; the latter assembly being particularly suited for use as a tamperproof decal or label.

PRESSURE SENSITIVE ADHESIVE COATED POLYMERIC FILM LAMINATES

This invention relates to a novel pressure sensitive adhesive construction as well as to its method of manufacture.

It is the prime object of this invention to provide novel laminates comprising polymeric films coated, on one surface, with a film of a pressure sensitive adhesive, said laminates being extremely fragile so that they will rupture when attempts are made to remove them from the substrates to which they have been adhered. It is a further object of this invention to prepare such novel pressure sensitive adhesive coated polymeric films by means of a procedure which is substantially less complex than the techniques heretofore utilized for the preparation of laminates of this type.

Various other objects and advantages of this invention will become apparent from the following detailed description thereof taken in conjunction with the accompanying drawing in which:

FIGS. 1 to 6 illustrate successive stages in the preparation and subsequent utilization of the novel laminates of the present invention.

For many industrial and consumer applications, there is a need for a type of thin, fragile polymeric film structure coated on one surface with a pressure sensitive adhesive, said film structure being prepared in such a manner and possessing certain properties so that when it has been adhered to a substrate it becomes essentially impossible to remove it therefrom, without either mutilating or completely destroying it. Such products may be either clear or tinted and may, if desired, carry a printed design or inscription. The fragility or friability of laminates of this type is particularly desirable in applications wherein it is necessary to provide a so-called "tamper-proof decal" which, by rupturing, will readily reveal when any attempts have been made to remove it from the substrate to which it has been adhered.

Another novel application for such fragile or friable polymeric, adhesive coated laminates is as a protective coating for ordinary paper labels such, for example, as are applied to library books in order to facilitate their identification. The latter labels frequently become frayed and dirty and often tend to fall off. However, by covering such labels with the laminates of this invention, they are completely protected from dirt and fraying and can no longer be removed from the books to which they have been adhered. Similarly, the laminates of this invention can be used for the protection of paper labels adhered to bottles, or other containers holding corrosive chemicals or containers having labels which may tend to come into contact with excessive amounts of moisture as in a humid environment or through outdoor exposure.

As heretofore prepared, such tamperproof decals required the use of a large number of tedious, manual operations which could not, of course, be adapted to high speed coating apparatus and which, therefore, necessitated preparing these products as individual units rather than in the more economical form of a continuous web from which individual units could then be die cut to the desired size and shape. In contrast, the novel laminates of this invention are prepared by means of a simple technique which eliminates all of the manual operations inherent in the prior art procedures, thereby allowing for the use of modern, high speed coating apparatus which permits these pressure sensitive adhesive coated polymer films to be prepared in web form.

Figure 2:
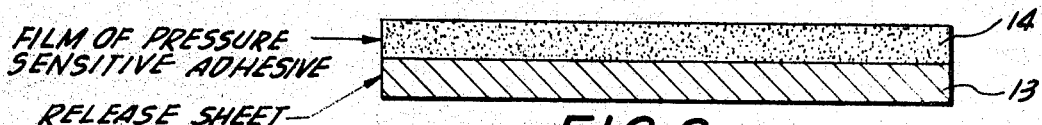

Referring now more in detail to the drawing, FIG. 1 illustrates one of the initial stages in the manufacture of the products of this invention; a film of a suitable polymeric material is cast from a lacquer, i.e. an organic solvent solution, onto a casting sheet 12 and the resulting polymer film coating 11 is thereupon dried in order to remove the solvent therefrom. A second initial operation in the process of this invention is depicted in FIG. 2; a high release type silicone coated paper sheet 13 is coated with a film of a tacky, pressure sensitive adhesive which is also cast from an organic solvent solution and the resulting pressure sensitive adhesive film 14 is thereupon dried so as to remove the solvent therefrom. It should be noted at this point that the particular operation depicted in FIG. 1 need not necessarily be completed prior to the operation depicted in FIG. 2 inasmuch as the latter step can be conducted first if so desired.

Figure 3:
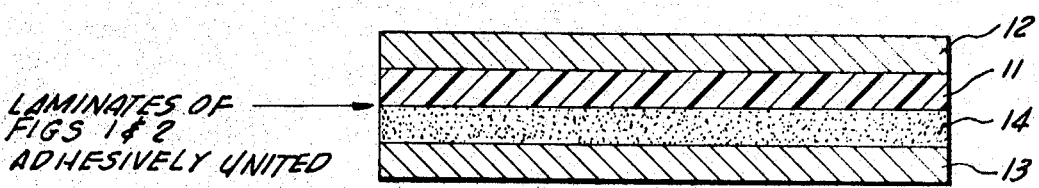

The casting sheet 12 with the dry polymer film 11 coated thereon is next laminated, i.e. adhered, to the pressure sensitive adhesive film 14 on the silicone coated paper release sheet 13 so that in the resulting assembly, as shown in FIG. 3, the polymer film 11 and the pressure sensitive adhesive film 14 are in intimate, face-to-face contact with one another.

Figure 4:
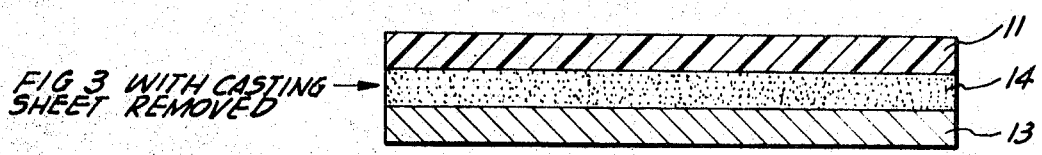
Figure 5:

The casting sheet 12 is then removed from the polymer film 11 so as to leave the assembly embodied in FIG. 4. In the latter form, the products of this invention may be conveniently handled and stored since the adhesive film 14 is still completely covered by the release sheet 13. Finally, immediately prior to the actual utilization of these products when they are to be adhered to a substrate, the release sheet 13 is removed from the surface of the pressure sensitive adhesive film 14 so as to leave the ultimate product which, as shown in FIG. 5, comprises a two ply laminate in which the upper lamina is the polymer film 11 while the lower lamina is the pressure sensitive adhesive film 14. The latter laminate may then be adhered to a solid substrate 15 via the surface of the pressure sensitive adhesive film 14 as is depicted in FIG. 6.

Figure 6:
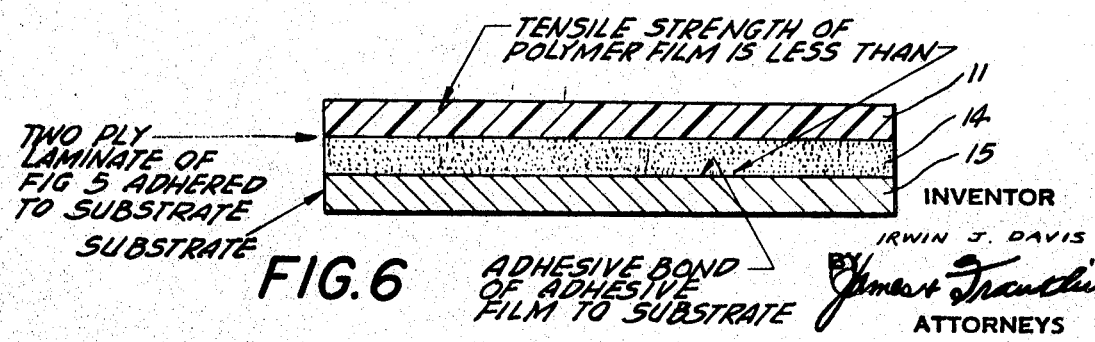

The essential aspect of this invention resides in the fact that in the novel laminates resulting thereof, there is a combination of a polymer film 11 and pressure sensitive adhesive film 14, as depicted in FIG. 6, wherein the tensile strength, at the breaking point, of the polymer film 11 is less than the strength of the adhesive bond between the pressure sensitive adhesive film 14 and the substrate 15 with which it is in contact. Only if these particular requirements are fulfilled is it then possible for the resulting laminates of this invention to display the property which is desired, namely, the ability on the part of the polymer film 11 of the laminate of FIG. 6 to tear and/or rupture when an attempt is made to remove it from the substrate 15 to which it has been adhered via the surface of the pressure sensitive adhesive film 14. The latter property is made possible by the fact that since the tensile strength of the polymer film 11 is less, at the breaking point, than the strength of the adhesive bond between the adhesive film 14 and the substrate 15 to which it is adhered, any attempt which is made to forcibly remove the laminate from the substrate 15 will cause the polymer film 11 to tear or rupture before it is possible to dislodge or remove its adhesive backing 14 from the substrate 15.

More specifically, it is necessary to select a polymer whole free films, at a dry thickness with in the range of from 0.4 to 2.0 mils, will have a tensile strength, at their breaking point, which is less than the strength of the adhesive bond between the pressure sensitive adhesive film backing and the substrate to which the latter adhesive film is adhered when the thickness of the adhesive film is within the range of from 0.5 to 1.5 mils. In other words, the free film of the polymer should have a tensile strength, at its breaking point, which is less than the adhesive bond displayed between a substrate and the pressure sensitive adhesive film of the laminate depicted in FIG. 6. Thus, when an attempt is made to delaminate the assembly depicted in FIG. 6 from its substrate, as by the use of the fingers or with a knife or other sharp edged device, the polymer film will rupture before the laminate can be removed from the substrate.

The procedures which may be utilized in determining the tensile strength of the free polymer film at its breaking point and the strength of the adhesive bond between the pressure sensitive adhesive film and the substrate to which it is adhered are as follows:

Procedure A. The tensile strength of the polymer film at its breaking point is determined by the following procedure: a 1×3inch sample of the selected polymer film, having a dry thickness within the indicated limits of from 0.4 to 2.0 mils, is prepared by casting a lacquer containing the polymer dissolved therein onto the surface of a substrate from which the resulting film, after drying for about 2 minutes at 180° F., may be readily removed. A 1 inch section at each end of the film sample is then clamped, respectively, within the jaws of a suitable device for determining tensile strength such, for example, as the Instron Tensile Tester. The jaws of the testing device are initially separated by a distance of 1 inch and the device is operated at a constant speed of 12 inches per minute until the film is broken and its tensile strength at the breaking point, in units of ounces per inch width, thereupon recorded.

Procedure B. The strength of the adhesive bond between a substrate and the pressure sensitive adhesive film surface of the laminate adhered thereto is determined by the following procedure: a 1×3inch sample of the polymer film, having a dry thickness within the indicated limits of from 0.4 to 2.0 mils, is prepared by means of the procedure described hereinabove in procedure A. Prior to removing this dry polymer film from the surface of the casting sheet, it is coated with a film, having a dry thickness of from 0.5 to 1.5 mils, of the selected pressure sensitive adhesive. The latter operation is accomplished by casting a lacquer containing the selected pressure sensitive adhesive onto the surface of a silicone coated release sheet and, after drying, this pressure sensitive adhesive film is adhered to the exposed surface of the polymer film whereupon the casting sheet is removed therefrom.

The release sheet is then removed from the adhesive coated surface of the polymer film and the resulting laminate is adhered to a stainless steel plate so that a one inch section at one end of the strip remains free and unadhered. To the latter free end of the adhesive coated polymer film there is adhered a 1×3inch leader made of polyethylene glycol terephthalate having a thickness of 1.0 mil. This leader is clamped into the upper jaw of the Instron Tester while the steel plate is clamped within the lower jaw in such a manner as to attain an angle of 180° between the strip of the adhesive coated polymer film and the surface of the steel plate. The device is then allowed to operate so that the jaws are moved apart from one another at a constant speed of 12 inches per minute until the point at which either: (1) the adhesive coated film pulls free from the surface of the steel plate whereupon the strength of the adhesive bond, in ounces per inch width is recorded or, (2) the polymer film ruptures before delamination is effected.

Thus, in those cases wherein the tensile strength of the polymer film is less than that of the strength of the adhesive bond between the adhesive coated film and the substrate to which it is adhered, i.e., the steel plate, the polymer film will, of course, rupture before the film is delaminated from the substrate. However, where there has been a poor choice with regard to selecting a combination of polymer film and pressure sensitive adhesive so that the strength of the adhesive bond between the adhesive coated film and the substrate is less than the strength of the polymer film, then the adhesive coated film will delaminate from the substrate before the polymer film ruptures. The preparation of such products is to be avoided in the process of this invention inasmuch as they comprise typical pressure sensitive tapes which cannot be utilized as tamperproof decals.

Although the above described test procedures are helpful in evaluating the potential performance of the products to be prepared by means of the process of this invention, it is also possible to prepare these products and to directly evaluate their performance without utilizing any of these preliminary tests. Such a direct test would involve attempting to delaminate such a product from a substrate to which it has been adhered. Thus, if the product were satisfactory, the polymer film would rupture prior to delamination and thereby indicate that it fulfilled the necessary specifications required by the products of this invention.

Among the polymer materials which are applicable for use in the preparation of the novel pressure sensitive laminates of this invention are: (1) the polymers of the lower alkyl, i.e., $C_1-C_4$, acrylate esters which include, for example, polymethyl methacrylate, polyethyl methacrylate, polyethyl acrylate, polybutyl acrylate, and polybutyl methacrylate as well as copolymers of any two, or more, of these lower alkyl acrylate esters with one another or with minor amounts of one or more ethylenically unsaturated, i.e. vinyl, comonomers such as vinyl acetate, vinyl chloride, styrene, acrylonitrile, and the lower alkyl esters of maleic and fumaric acids; (2) polyvinyl chloride and copolymers of vinyl chloride with one or more ethylenically unsaturated comonomers such as vinyl acetate and the lower alkyl esters of maleic and fumaric acids; and, (3) ethers and esters of cellulose such as ethyl cellulose, cellulose butyrate, nitrocellulose, cellulose acetate, and cellulose triacetate.

As for the applicable tacky, pressure sensitive adhesives which may be utilized in the process of this invention, the latter may be based upon any elastomeric material such as: (1) natural rubber; (2) synthetic rubbers including, for example, styrene-butadiene copolymers, polyisobutylene, butadiene-acrylonitrile copolymers, polychloroprene, and polyisoprene; (3) elastomeric copolymers containing at least 50 percent, by weight, of a $C_4-C_{12}$ alkyl acrylate ester, i.e., an alkyl acrylate ester wherein the alkyl group contains from four to 12 carbon atoms, together with a hardening comonomer selected from the group consisting of vinyl acetate, styrene, methyl methacrylate, ethyl methacrylate, and vinyl chloride; and, (4) elastomeric polymers of alkyl vinyl ethers such, for example, as polymethyl vinyl ether and polyethyl vinyl ether.

As noted earlier, both the polymer film and the pressure sensitive adhesive film are initially deposited, or cast, from lacquers. Among the various organic solvents which may be utilized in preparing these lacquers are methyl ethyl ketone, toluene, methyl isobutyl ketone, xylene, ethyl alcohol, heptane, and ethyl acetate. The total solids content of the polymer lacquers may be in the range of from about 10 to 50 percent, by weight, whereas the total solids content of the pressure sensitive adhesive lacquers may be in the range of from about 15 to 60 percent, by weight.

The polymer lacquers may also contain various additives including plasticizers such as those based upon phthalate esters, polymeric plasticizers based on polyesters, and the aryl phosphate esters; antioxidants such as octyl phenol; metallic salt stabilizers; ultraviolet absorbers such as the derivatives of phenyl salicylate and benzophenone; and, pigments such as titanium dioxide. As for the pressure sensitive adhesive lacquers, these may contain, in addition to the above listed elastomeric bases, various additives including tackifiers such as the rosin esters and the polyterpene resins; antioxidants such as the hydroquinone derivatives; fillers such as zinc oxide; and, colorants such as titanium dioxide.

The casting sheet upon which the polymer lacquer is initially cast may comprise any nonabsorbent substrate having a relatively smooth finish along with a low degree of adhesion for the dry polymer film. Materials suitable for this purpose include sheets or films of polyethylene glycol terephthalate as well as paper which has been coated with a thermoplastic resin such as polyethylene or polypropylene or with a thermosetting varnish type material such as a mixture of melamine and alkyd resins. As previously indicated, the pressure sensitive adhesive is initially cast upon a high release type silicone coated paper sheet from which the resulting adhesive film may then be readily removed after it has been adhered to the surface of the polymer film.

The polymer lacquer as well as the pressure sensitive adhesive lacquer may be coated upon their respective substrates by utilizing any of the various coating techniques which are ordinarily employed with lacquer systems including, for example, reverse roll coating, knife coating, and gravure coating. In drying either the polymer films or the pressure sensitive adhesive films in order to remove the solvent therefrom, they may be exposed to temperatures in the range of from about 160° to 250° F. for periods of from about 0.25 to 2.0 minutes. Conventional drying equipment such as hot air ovens and infrared radiating ovens may be used for this purpose.

In the preferred embodiment of this invention, the polymer film which is utilized is selected from the class of the polymers of the lower alkyl acrylate esters with either polymethyl methacrylate or polyethyl methacrylate being especially suitable. A film of polyethylene glycol terephthalate comprises the preferred casting sheet for the polymer film while, with regard to the choice of the pressure sensitive adhesive base, it has been found that optimum results are obtained with the pressure sensitive adhesives which are based on the elastomeric copolymers containing at least 50 percent, by weight, of a $C_4$-$C_{12}$ of alkyl acrylate ester together with a hardening comonomer. An example of such a copolymer is the 1:1 copolymer of octyl acrylate with vinylacetate. The use of this particular combination of a polymethyl methacrylate polymer film with an actyl acrylate:vinyl acetate copolymer as the pressure sensitive adhesive base has been found to yield laminates having a high degree of clarity along with excellent light stability.

As noted earlier, the prime prerequisite necessary for the successful performance of the products of this invention is the requirement that the polymer film, at a thickness of from 0.4 to 2.0 mils, have a tensile strength at its breaking point which is less than the strength of the adhesive bond between the pressure sensitive adhesive film, having a thickness of from 0.5 to 1.5 mils, and the substrate to which the latter adhesive film, having the polymer film on its upper surface, is adhered. The products of this invention are thus seen to be based upon the manufacture of thin, friable polymeric films that are cast from organic solvent solutions and which must be continually supported until immediately prior to their ultimate use. These novel products are therefore different from the many pressure sensitive tapes heretofore available inasmuch as they utilize laminates prepared in such a manner that once they are applied to a substrate, the resulting adhesive bond, thereto, is essentially permanent since the adhesive strength of the laminate is of greater magnitude than the film strength of the polymeric film comprising the upper lamina of the tape.

The products of this invention may be considered as polymeric coatings in the convenient form of tapes or labels since what has, in effect, been prepared are polymeric lacquer coatings from which the solvent has been removed and upon which a film of a pressure sensitive adhesive has been applied whereupon the latter adhesive coating is given a supporting or backing sheet. This technique greatly enhances the ease of utilization of the resulting novel products and makes it possible to employ then in a great many decorative and protective functions wherein conventional lacquer coatings or pressure sensitive adhesive tapes cannot be used or wherein their use provides poor results. Such applications include their use as tamperproof decals; as protective and/or tamperproof coatings for book labels, and for paper labels in general; and as patching materials for items made from polyvinyl chloride film such, for example as raincoats and inflatable beach balls. As noted earlier the products of this invention may be clear, pigmented or imprinted with a design or message.

The following examples will further illustrate the embodiment of this invention. In these examples all parts given are by weight unless otherwise noted.

EXAMPLE I

This example illustrates the preparation of one of the novel pressure sensitive laminates of this invention.

In preparing this product, the procedure which was followed consisted in first coating a polymer lacquer comprising:

| | Parts |
|---|---|
| polyethyl methacrylate | 70.0 |
| a polyester plasticizer | 5.0 |
| methyl ethyl ketone | 140.0 |
| toluene | 200.0 |
| methyl isobutyl ketone | 200.0 | onto a casting sheet comprising a sheet of bleached kraft paper, having a basis weight of 60 pounds per ream, upon which there was a 1.0-mil. thick coating of polyethylene. The polymer lacquer coating was dried for two minutes in an oven set at 180° F. and the resulting dried coating had a thickness of 1.5 mils. (A free film of this polyethyl methacrylate polymer, having a thickness of 1.5 mils., was prepared and tested by means of procedure A, described hereinabove, and was found to have a tensile strength, at the breaking point, of 35 ounces per inch width.)

To the dry polyethyl methacrylate film on the casting sheet there was then adhered a 0.5-mil. film, dry thickness, of a polyisobutylene based pressure sensitive adhesive which had been cast upon a silicone coated release sheet from a lacquer having the following composition:

| | Parts |
|---|---|
| polyisobutylene | 100.0 |
| a polyterpene resin having a melting point at 25° C. (tackifier) | 25.0 |
| a polyterpene resin having a melting point at 115° C. (tackifier) | 50.0 |
| heptane | 300.0 |
| toluene | 100.0 |

In preparing this pressure sensitive adhesive film, it had been dried for one minute at 220° F. before it was brought into contact with the polyethyl methacrylate film so as to complete the preparation of the laminate whereupon the casting sheet was removed therefrom. Prior to using the resulting product, it was merely necessary to remove the silicone treated release sheet from the surface of the pressure sensitive adhesive film whereupon the laminate could then be adhered to any desired solid substrate. When attempts were made to remove this laminate from a steel substrate to which it was then adhered, it was found that the polymer film ruptured before delamination could be effected.

The latter observation thus confirmed the results of a test which had been conducted with a sample of this laminate in order to determine the strength of the adhesive bond between the pressure sensitive adhesive film and a substrate adhered thereto. This test was conducted according to Procedure B, described hereinabove, and had also indicated that, as desired, the strength of the polymer film was less than that of the adhesive bond.

EXAMPLE II

This example illustrates the preparation of another of the novel products of this invention.

In preparing this laminate, the identical procedure, as described in example I hereinabove, was again utilized. In this instance, however, a 2.0 mil. thick sheet of polyethylene glycol terephthalate served as the casting sheet for the polymer lacquer. Moreover, the polymer lacquer used in preparing this laminate was an ethyl cellulose lacquer having the following composition:

| | Parts |
|---|---|
| ethyl cellulose | 40.0 |
| tricresyl phosphate (plasticizer) | 8.0 |
| toluene | 120.0 |
| xylene | 100.0 |
| ethyl alcohol | 30.0 |
| butylated hydroxy toluene (antioxidant) | 0.8 | and when dried the resulting polymer film had a thickness of 0.4 mils. A free film of the ethyl cellulose polymer, having a thickness of 0.4 mils., was prepared and tested by means of procedure A, described hereinabove and was found to have a tensile strength, at the breaking point, of 38.4 ounces per inch width.

The pressure sensitive adhesive which was used for the preparation of this laminate was based on a 1:1 octyl acrylate:vinyl acetate copolymer and had the following composition:

| | Parts |
|---|---|
| 1:1 octyl acrylate:vinyl acetate copolymer | 120.0 |
| triethylene glycol ester of hydrogenated rosin (tackifier) | 15.0 |
| glycerol ester of hydrogenated rosin (tackifier) | 30.0 |

| | |
|---|---|
| toluene | 150.0 |
| ethyl acetate | 54.0 |
| toluene | 126.0 |

The above described pressure sensitive adhesive lacquer had been cast upon a silicone coated release sheet so as to yield a film whose dry thickness was 0.8 mils.

When attempts were made to remove the resulting laminate from a steel substrate to which it was then adhered, it was found that the polymer film ruptured before delamination could be effected. The latter observation thus confirmed the results of a test which had been conducted with a sample of this laminate in order to determine the strength of the adhesive bond between the pressure sensitive adhesive film and a substrate adhered thereto. This test was conducted according to procedure B, described hereinabove, and had also indicated that, as desired, the strength of the polymer film was less than that of the adhesive bond.

EXAMPLE III

This example illustrates the preparation of a pressure sensitive laminate which did not conform to the specifications of this invention inasmuch as the tensile strength of the polymer film, at the breaking point, was greater than the strength of the adhesive bond between the pressure sensitive adhesive film and a substrate to which it was adhered.

In preparing this laminate, the identical procedure, including the same polyethyl methacrylate as described in example I hereinabove, were again utilized and the dry polymer film once more had a thickness of 1.5 mils. (As noted in example I, when a free film of this polyethyl methacrylate polymer, having a thickness of 1.5 mils, was prepared and tested by means of procedure A, described hereinabove, and was found to have a tensile strength, at the breaking point, of 35 ounces per inch width.)

The pressure sensitive adhesive lacquer which was used for this product was based on natural rubber and had the following composition:

| | Parts |
|---|---|
| No. 1 pale crepe rubber milled to a Mooney viscosity value of 55 | 100.0 |
| 2,5-di(tert. amyl) hydroquinone (antioxidant) | 2.0 |
| glycerol ester of hydrogenated rosin (tackifier) | 75.0 |
| heavy mineral oil | 7.5 |
| heptane | 300.0 |
| toluene | 100.0 |

The above described adhesive lacquer had been cast upon a silicone coated release sheet so as to yield a dry coating having a thickness of 0.8 mils.

When attempts were made to remove the resulting laminate from a steel substrate to which it had been adhered, it was readily delaminated therefrom without any damage being inflicted upon the polymer film which was seen to remain intact. This laminate was, therefore, completely inoperable as a tamperproof decal. The latter observation thus confirmed the results of a test which was conducted with a sample of this laminate in order to determine the strength of the adhesive bond between the pressure sensitive film and a substrate adhered thereto. This test was conducted according to procedure B, described hereinabove, and indicated that the strength of the adhesive bond was 11.2 ounces per inch width. The latter value was, of course, less than that of the tensile strength, at the breaking point, of the polymer film as was indicated by the results obtained with procedure A and therefore resulted in the delamination of the laminate from the substrate prior to any tearing or rupturing on the part of the polymer film.

Summarizing, this invention is seen to provide novel pressure sensitive adhesive coated laminates which are particularly suited for use as tamperproof decals and which can be prepared by means of a simple, convenient procedure. Variations may be made in proportions, procedures and materials without departing from the scope of this invention defined by the following claims.

I claim:

1. A two ply laminate wherein the upper lamina comprises: (I) a friable polymeric film which is derived from the group consisting of (A) homopolymers of the $C_1$–$C_4$ lower alkyl acrylate and methacrylate esters as well as copolymers of the latter $C_1$–$C_4$ lower alkyl acrylate and methacrylate esters with one another and with minor amounts of at least one vinyl comonomer selected from the group consisting of vinyl acetate, vinyl chloride, styrene, acrylonitrile and the $C_1$–$C_4$ lower alkyl esters of maleic and fumaric acids; (B) polyvinyl chloride and copolymers of vinyl chloride with at least one vinyl comonomer selected from the group consisting of vinyl acetate and the $C_1$–$C_4$ lower alkyl esters of maleic and fumaric acids; and, (C) ethers and esters of cellulose; and the lower lamina, which is bonded to and in intimate face-to-face contact with said upper lamina, comprises: (II) a film of a tacky, pressure sensitive adhesive selected from the group consisting of: (A) natural rubber; (B) synthetic rubbers selected from the group consisting of styrene-butadiene copolymers, polyisobutylene, butadiene-acrylonitrile copolymers, polychloroprene and polyisoprene; and (C) elastomeric copolymers containing at least 50 percent, by weight, of at least one $C_4$–$C_{12}$ alkyl ester of an acid selected from the group consisting of acrylic and methacrylic acids together with a hardening comonomer selected from the group consisting of vinyl acetate, styrene, methyl methacrylate, ethyl methacrylate and vinyl chloride; and, (D) elastomeric polymers of alkyl vinyl ethers selected from the group consisting of polymethyl vinyl ether and polyethyl vinyl ether; the said polymeric film having a tensile strength, at its breaking point, which is less than the strength of the adhesive bond formed between the said pressure sensitive adhesive film and any solid substrate to which said pressure sensitive adhesive film may be adhered, thereby resulting in the mechanical rupture of said upper lamina polymeric film when an attempt is made to remove the laminate from said solid substrate.

2. The two ply laminate of claim 1, wherein the exposed surface of said lower lamina tacky, pressure sensitive adhesive film, is adhered to a silicone coated release sheet.

3. A two ply laminate wherein the upper lamina comprises: (I) a friable polymeric film selected from the class of polymers consisting of the polymers of the $C_1$–$C_4$ alkyl acrylate and methacrylate esters and the copolymers of the latter $C_1$–$C_4$ lower alkyl acrylate and methacrylate esters with one another as well as with minor amounts of at least one vinyl comonomer selected from the group consisting of vinyl acetate, vinyl chloride, styrene, acrylonitrile and the $C_1$–$C_4$ lower alkyl esters of maleic and fumaric acids; and the lower lamina, which is bonded to and in intimate face-to-face contact with said upper lamina, comprises: (II) a film of a tacky, pressure sensitive adhesive based upon a copolymer containing at least 50 percent, by weight, of at least one of the $C_4$–$C_{12}$ alkyl esters of acrylic and methacrylic acids together with a hardening comonomer selected from the group consisting of vinyl acetate, styrene, methyl methacrylate, ethyl methacrylate, and vinyl chloride; the said polymeric film having a tensile strength, at its breaking point, which is less than the strength of the adhesive bond formed between the said pressure sensitive adhesive film and any solid substrate to which said pressure sensitive film may be adhered, thereby resulting in the mechanical rupture of said upper lamina polymeric film when an attempt is made to remove the laminate from said solid substrate.

4. The two ply laminate of claim 3, wherein the exposed surface of said lower lamina tacky, pressure sensitive adhesive film, is adhered to a silicone coated release sheet.

5. A method of preparing a two ply laminate wherein the upper lamina comprises: (I) a friable polymeric film which is derived from the group consisting of (A) homopolymers of the $C_1$–$C_4$ lower alkyl acrylate and methacrylate esters as well as copolymers of the latter $C_1$–$C_4$ lower alkyl acrylate and methacrylate esters with one another and with minor amounts of at least one vinyl comonomer selected from the group consisting of vinyl acetate, vinyl chloride, styrene, acrylonitrile and the $C_1$–$C_4$ lower alkyl esters of maleic and fumaric acids; (B) polyvinyl chloride and copolymers of vinyl chloride with at least one vinyl comonomer selected from the group consisting of vinyl acetate and the $C_1$–$C_4$ lower alkyl esters of maleic and fumaric acids; and, (C) ethers and esters of cellulose; and the lower lamina, which is bonded to and in intimate face-to-face contact with said upper lamina, comprises: (II) a film of a tacky, pressure sensitive adhesive selected from the group consisting of: (A) natural rubber; (B) synthetic rubbers selected from the group consisting of styrene-butadiene copolymers, polyisobutylene, butadiene-acrylonitrile copolymers, polychloroprene and polyisoprene; and (C) elastomeric copolymers containing at least 50 percent, by weight, of at least one $C_4$–$C_{12}$ alkyl ester of an acid selected from the group consisting of acrylic and methacrylic acids together with a hardening comonomer selected from the group consisting of vinyl acetate, styrene, methyl methacrylate, ethyl methacrylate and vinyl chloride; and, (D) elastomeric polymers of alkyl vinyl ethers selected from the group consisting of polymethyl vinyl ether and polyethyl vinyl ether; the said polymeric film having a tensile strength, at its breaking point, which is less than the strength of the adhesive bond formed between the said pressure sensitive adhesive film and any solid substrate to which said pressure sensitive adhesive film may be adhered, thereby resulting in the mechanical rupture of said upper lamina when an attempt is made to remove the laminate from said solid substrate; said method comprising the steps of; (1) casting a solution of said polymeric film in an organic solvent, onto a casting sheet substrate having a nonabsorbent surface, a smooth finish and a low degree of adhesion for the resulting polymer film; (2) drying the polymeric film obtained in step (1) so as to remove the organic solvent therefrom; (3) casting a solution of said pressure sensitive adhesive, in an organic solvent, onto a silicone coated release sheet; (4) drying the pressure sensitive adhesive film obtained in step (3) so as to remove the organic solvent therefrom; (5) adhering the dry polymer film resulting from steps (1) and (2) onto the exposed surface of the pressure sensitive adhesive film resulting from steps (3) and (4) so that the polymer film and the pressure sensitive adhesive film are bonded in intimate, face-to-face contact with one another; (6) removing the casting sheet from the surface of the polymer film; and (7) removing the silicone coated release sheet from the surface of the pressure sensitive adhesive film, thereby resulting in the two ply laminate which may then be adhered to any solid substrate via the exposed surface of the pressure sensitive adhesive film forming lower lamina of said laminate.

6. A method of preparing a two-ply laminate wherein the upper lamina comprises: (I) a friable polymeric film derived from a polymer selected from the group consisting of (A) homopolymers of the $C_1$–$C_4$ lower alkyl acrylate and methacrylate esters as well as copolymers of the latter $C_1$–$C_4$ lower alkyl acrylate and methacrylate esters with one another and with minor amounts of at least one vinyl comonomer selected from the group consisting of vinyl acetate, vinyl chloride, styrene, acrylonitrile and the $C_1$–$C_4$ lower alkyl esters of maleic and fumaric acids; and, the lower lamina which is bonded to and in intimate face-to-face contact with said upper lamina, comprises: (II) a film of a tacky, pressure sensitive adhesive comprising a copolymer containing at least 50 percent, by weight, of at least one $C_4$–$C_{12}$ alkyl ester of an acid selected from the group consisting of acrylic and methacrylic acid together with a hardening comonomer selected from the group consisting of vinyl acetate, styrene, methyl methacrylate, ethyl methacrylate and vinyl chloride; the said polymeric film having a tensile strength, at its breaking point, which is less than the strength of the adhesive bond formed between the said pressure sensitive adhesive film and any solid substrate to which said pressure sensitive adhesive film may be adhered, thereby resulting in the mechanical rupture of said upper lamina when an attempt is made to remove the laminate from said solid substrate; said method comprising the steps of: (1) casting a solution of said polymeric film, in an organic solvent, onto a casting sheet substrate having a nonabsorbent surface, a smooth finish and a low degree of adhesion for the resulting polymer film; (2) drying the polymeric film obtained in step (1) so as to remove the organic solvent therefrom; (3) casting a solution of said pressure sensitive adhesive, in an organic solvent, onto a silicone coated release sheet; (4) drying the pressure sensitive adhesive film obtained in step (3) so as to remove the organic solvent therefrom; (5) adhering the dry polymer film resulting from steps (1) and (2) onto the exposed surface of the pressure sensitive adhesive film resulting from steps (3) and (4) so that the polymer film and the pressure sensitive adhesive film are bonded in intimate, face-to-face contact with one another; (6) removing the casting sheet from the surface of the polymer film; and (7) removing the silicone coated release sheet from the surface of the pressure sensitive adhesive film, thereby resulting in the two-ply laminate which may then be adhered to any solid substrate via the exposed surface of the pressure sensitive adhesive film forming lower lamina of said laminate.

* * * * *